United States Patent
Lei

(10) Patent No.: US 9,667,059 B2
(45) Date of Patent: May 30, 2017

(54) BATTERY PROTECTION DEVICE AND BATTERY DEVICE

(71) Applicant: Xingliang Lei, Shenzhen (CN)

(72) Inventor: Xingliang Lei, Shenzhen (CN)

(73) Assignee: SHENZHEN CARKU TECHNOLOGY CO., LTD., Yifang Industrial Park, Bantian, Longgang District, Shenzhen (CN)

( * ) Notice: Subject to any disclaimer, the term of this patent is extended or adjusted under 35 U.S.C. 154(b) by 92 days.

(21) Appl. No.: 14/441,171

(22) PCT Filed: Nov. 8, 2013

(86) PCT No.: PCT/CN2013/086761
§ 371 (c)(1),
(2) Date: May 6, 2015

(87) PCT Pub. No.: WO2014/075585
PCT Pub. Date: May 22, 2014

(65) Prior Publication Data
US 2015/0270705 A1    Sep. 24, 2015

(30) Foreign Application Priority Data
Nov. 19, 2012 (CN) .......................... 2012 1 0468198

(51) Int. Cl.
*H02H 9/02* (2006.01)
*H02J 7/34* (2006.01)
*H02J 7/00* (2006.01)

(52) U.S. Cl.
CPC ............. *H02H 9/02* (2013.01); *H02J 7/0029* (2013.01); *H02J 7/0042* (2013.01);
(Continued)

(58) Field of Classification Search
CPC ........ H02H 9/02; H02J 7/0029; H02J 7/0042; H02J 7/0047; H02J 7/34; H02J 2007/0039
(Continued)

(56) References Cited

U.S. PATENT DOCUMENTS

| | | | |
|---|---|---|---|
| 2006/0113377 A1* | 6/2006 | Wilcox | G06K 19/0705 235/380 |
| 2009/0146607 A1* | 6/2009 | Yang | H02J 7/345 320/103 |

(Continued)

FOREIGN PATENT DOCUMENTS

| | | |
|---|---|---|
| CN | 101399119 A | 4/2009 |
| CN | 201257910 Y | 6/2009 |

(Continued)

OTHER PUBLICATIONS

"International Search Report for PCT/CN2013/086761".

*Primary Examiner* — Scott Bauer
(74) *Attorney, Agent, or Firm* — Jun He Law Offices P.C.; James J. Zhu

(57) ABSTRACT

There discloses a battery protection device. The battery protection device has a housing, a shunt device (4) disposed within the housing, and a positive connecting terminal and a negative connecting terminal coupled to a battery. The shunt device comprises an energy storage apparatus (1), a stabilizing circuit (3) for stabilizing the voltage of the energy storage device, and a voltage detection and display device (2) for feeding back in real time a terminal voltage of the energy storage device. The energy storage device is coupled in parallel with the stabilizing circuit and the voltage detection and display device. The positive connection terminal is coupled to a positive terminal of the energy storage device; and the negative connecting terminal is coupled to a negative terminal of the energy storage device. A battery device
(Continued)

comprises a battery, said battery is provided with poles, and further comprises the battery protection device. The battery protection device is attached to an exterior of the battery via a double-sided adhesive. Connectors (5) at free ends of the conductive cables of the positive connecting terminal and of the negative connecting terminal are configured to encircle the poles to connect the battery protection apparatus in parallel with the battery. The battery device provides stable discharging and has an improved lifetime.

14 Claims, 1 Drawing Sheet

(52) U.S. Cl.
CPC .............. *H02J 7/0047* (2013.01); *H02J 7/34* (2013.01); *H02J 2007/0039* (2013.01)

(58) Field of Classification Search
USPC ........................................................ 361/93.9
See application file for complete search history.

(56) References Cited

U.S. PATENT DOCUMENTS

| | | | |
|---|---|---|---|
| 2011/0115304 A1* | 5/2011 | Tai | .......................... B41J 29/393 307/109 |
| 2013/0130065 A1* | 5/2013 | Park | ..................... H01M 2/0275 429/7 |

FOREIGN PATENT DOCUMENTS

| | | | |
|---|---|---|---|
| CN | 201918786 U | 8/2011 | |
| CN | 102969700 A | 3/2013 | |
| CN | 202917956 U | 5/2013 | |

* cited by examiner

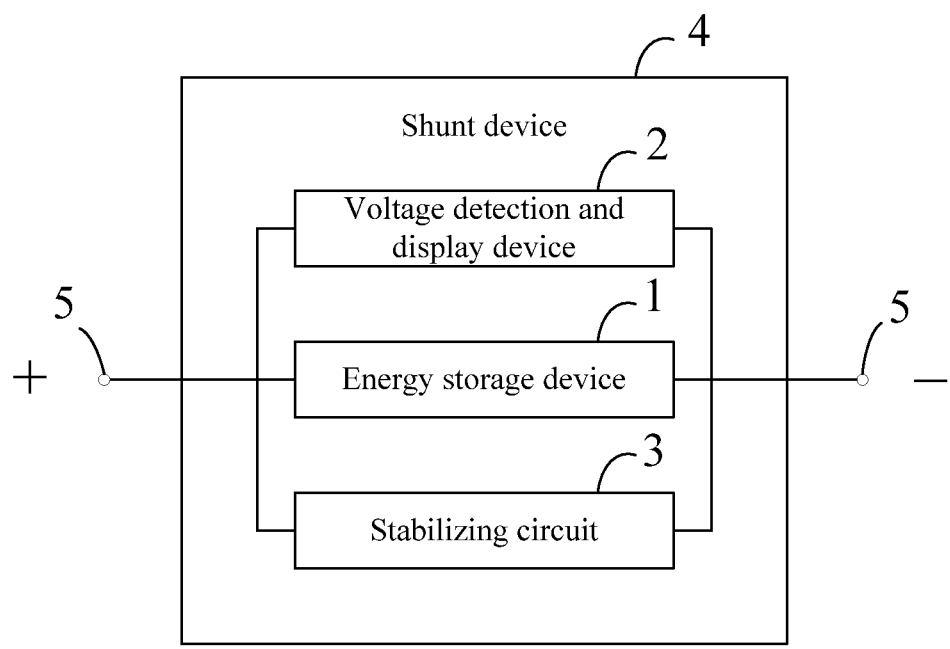

BATTERY PROTECTION DEVICE AND
BATTERY DEVICE

CROSS-REFERENCE TO RELATED
APPLICATIONS

This application is a U.S. national phase application of International Application No. PCT/CN2013/086761, filed with the State Intellectual Property Office of P. R. China on Nov. 8, 2013, which claims priority and benefits of Chinese Patent Application No. 201210468198.7, filed with the State Intellectual Property Office of P. R. China on Nov. 19, 2012, the entire content of which is incorporated herein by reference.

FIELD OF THE INVENTION

The present invention relates to battery protection technology, and more particularly to a battery protection device and battery device.

BACKGROUND OF THE INVENTION

More and more vehicle electronic devices such as vehicle GPS terminals, vehicle electric dogs, automobile reversing radars, driving recorders, and vehicle navigating systems, etc. are developed, which bring various conveniences to vehicle owners. However, currently these types of vehicle electronic devices are generally not equipped with independent power supplying system, and most of them use vehicle battery as their power source. The increase of electronic devices carried on the vehicles will place increasing pressure on power supply of internal batteries of the vehicles.

Battery is also known as storage battery. A storage battery is a type of battery that converts chemical energy into electrical energy. A battery usually used in vehicles is a lead-acid storage battery, i.e., a storage battery mainly made of lead and its oxide and with sulfuric acid solution as its electrolyte. The battery generally has the following functions in a vehicle:

1. As a power source for supplying a starting system, ignition system, electronic fuel injection system and other electrical devices of the vehicle, the battery is required to release a starting current as high as 200 A when the engine starts.
2. When the engine stops or operates at a low speed, the battery supplies power to various electronic devices of the vehicle.
3. When the power requirement of the vehicle exceeds the power supply capability of an electric generator, the battery provides auxiliary electricity.
4. The battery also functions as a voltage stabilizer for the power supply system of the whole vehicle, mitigating an impulse voltage of the power supply system to protect various electronic devices on the vehicle.
5. During the normal operation of the engine, extra electricity generated by the electric generator that hasn't been consumed by the vehicle can be stored by means of charging the battery with said extra electricity.

The first function mentioned above involves high current discharging, while the second to the fifth functions involves low current discharging. Given same time period, the high current discharging causes more damages to a battery than the low current discharging. The main reason is that the super saturation degree of lead sulfate formed at the solid-liquid interface is too high such that a relatively larger amount of lead sulfate crystal is formed and deposits at the solid-liquid interface, which not only blocks the micro-holes of the battery plates but also blocks the micro-holes of the separation plate. Thus, branch crystals are more likely to be generated. Moreover, many micro crystals may drop off during charging or discharging period of the battery, which will cause damages to the battery. Furthermore, due to the low diffusion speed of sulphuric acid, sulphuric acid can only reach the shallow layer of the electrolyte such that more alpha lead dioxide are discharged and converted, which may soften the pole panels easily and significantly reduce the lifetime of the battery.

The average lifetime of a vehicle battery is about 2 years. The number of vehicle in China has exceeded 100 millions in 2011. Calculated according to the average lifetime and the number of vehicles, about 50 millions batteries need to be replaced each year, which not only increases the use cost of vehicles but also is adverse to environment protection, as the replaced vehicle batteries will be discarded.

Chinese patent publication No. CN1801524A discloses an online maintainer for large capacity sealed lead acid storage battery. The maintainer has a DC power source, a starting signal circuit, a single-chip processor circuit, a shaping driver circuit, and an electronic switch. The DC power source supplies a desired DC current to the electronic switch, and the electronic switch converts the DC current into a pulse current and supplies the converted pulse current to a battery being repaired. After receiving a pulse instruction from the starting signal circuit, the single-chip processor circuit outputs a waveform with variable pulse width according to voltage detection and temperature detection data of the battery being repaired. The shaping driver circuit is used to control the on/off state of the electronic switch and the amplitude of a repair pulse current. Although in this patent application, pulsing technology is used to eliminate or reduce the crystallization of lead sulfate within the lead acid storage battery so as to recover the energy storage capacity, it still cannot protect the storage battery. Instead, it only repairs the battery with limited effect at the cost of consuming the electricity.

SUMMARY OF THE INVENTION

An objective of the present invention is to provide a battery protection device. An output voltage between two terminals of the battery protection device is stable. The battery protection device can display the voltage between the two terminals in real time, shunt a high current flowing through the battery when the vehicle starts, decrease the large instant current discharging of the battery and reduce the damages caused by the large current discharging, thereby to protect the battery and improve the lifetime of the battery.

A second objective of the present invention is to provide a battery device which is capable of discharging stably and has a long service life.

To achieve the aforementioned objectives, the present invention uses the technical solutions as follows.

There is disclosed a battery protection apparatus. The apparatus comprises a housing, a shunt device disposed within the housing, and a positive connecting terminal and a negative connecting terminal coupled to a battery. The shunt device comprises an energy storage device, a stabilizing circuit for stabilizing the voltage of the energy storage device, and a voltage detection and display device for feeding back in real time a terminal voltage of the energy storage device, the energy storage device being coupled in parallel with the stabilizing circuit and the voltage detection and display device, the positive connecting terminal being coupled to a positive terminal of the energy storage device, and the negative connecting terminal being coupled to a negative terminal of the energy storage device.

In certain embodiments, the energy storage device comprises a lithium iron phosphate battery or a super capacitor.

In certain embodiments, the voltage detection and display device comprises a voltage detection circuit and a display, the display having a press key for switching on or off the display.

In certain embodiments, the number of said lithium iron phosphate battery or super capacitor is 3 to 12.

In certain embodiments, the capacity of the lithium iron phosphate battery is 0.5 Ah to 10 Ah.

In certain embodiments, the capacitance of the super capacitor is 5 F to 350 F.

In certain embodiments, the positive connecting terminal and the negative connecting terminal are coupled to conductive cables, respectively, and the conductive cables have ring-shaped connectors at their free ends, respectively.

In certain embodiments, the housing has double-sided adhesive at its exterior.

In certain embodiments, the housing is a case made of plastic material or aluminum alloy.

There is disclosed a battery device. The battery has poles, wherein the battery device further comprises a battery protection device as provided above, the battery protection device being attachable to an exterior of the battery via a double-sided adhesive, and the connectors at the free ends of the conducting cables coupled to the positive connecting terminal and negative connecting terminal are configured to encircle the poles to couple the battery protection device in parallel with the battery.

The present invention has advantages as follows. The battery protection device according to the present invention stores electricity in the energy storage device, and provides the stabilizing circuit and the voltage detection and display device coupled in parallel with the energy storage apparatus. The stabilizing circuit can stabilize the voltage between the two terminals of the energy storage device, and the voltage detection and display apparatus can indicate the voltage between the two terminals of the energy storage device in real time and further indicate the real-time operation status of the battery. The battery protection device shunts a high current that flows through the battery when a vehicle starts, decreases the large instant current discharging of the battery, and reduces the damages caused by large current discharging, thereby achieving the objective of protecting the battery and improving the lifetime of the battery. After starting the vehicle, when the accelerator switches, the battery protection device also helps the battery to stabilize its voltage and reduces the voltage fluctuation of the battery. Moreover, the energy storage device may use lithium iron phosphate batteries or super capacitors, which have high charging and discharging efficiency and are beneficial for energy storage. The voltage detection and display device has a display embedded with the press key to control the operation status of the battery protection device. The conducting cables of the positive and negative terminals of the energy storage device have connectors at free ends thereof. Thus, it is easy to connect the battery protection device to the battery. With such a battery protection device, the battery device according to the present invention can discharge electricity stably and has a longer service life.

BRIEF DESCRIPTION OF DRAWINGS

FIG. 1 illustrates a battery protection device of the present invention.

The symbols and elements:
1—energy storage device;
2—voltage detection and display device;
3—stabilizing circuit;
4—shunt device;
5—connector.

DETAILED DESCRIPTION OF THE EMBODIMENTS

The specific of the invention will be described below with reference to the accompanying drawings and the embodiments.

FIG. 1 shows a battery protection device of the invention. The battery protection device includes a housing, a shunt device 4 disposed within the housing, a positive connecting terminal and a negative connecting terminal coupled to a battery. The shunt device 4 has an energy storage device 1, a stabilizing circuit 3 for stabilizing the voltage of the energy storage device 1, and a voltage detection and display device 2 for feeding back in real time the terminal voltage of the energy storage device 1. The energy storage device 1 is coupled in parallel with the stabilizing circuit 3 and the voltage detection and display device 2. The positive connecting terminal is coupled to a positive terminal of the energy storage device 1, and the negative connecting terminal is coupled to a negative terminal of the energy storage device 1.

When a vehicle starts, the battery provides power for an electric generator, which requires instantaneous high current discharging. At this moment, the energy storage device 1 of the battery protection device shunts the high current flowing through the battery and stores the extra electricity in the energy storage device 1. In this way, the instantaneous high discharging current can be decreased, and the damages caused by the high current discharging can be reduced. The stabilizing circuit 3 coupled in parallel with the energy storage device 1 effectively stabilizes the voltage between the two terminals of the energy storage device 1, thereby protecting the battery protection device. When the engine stops or stalls at a low speed, the battery directly supplies power to the devices in the vehicle. At the same time, the battery protection device may discharge the stored energy and assist the battery to supply power, thus protecting the battery.

The energy storage device 1 may be one or more lithium iron phosphate batteries or super capacitors. The number of lithium iron phosphate batteries or super capacitors is preferably 3 to 12. The capacity of the lithium iron phosphate batteries is 0.5 Ah to 10 Ah. The capacitance of the super capacitors is 5 F to 350 F. The high efficiency of charging and discharging of the aforementioned lithium iron phosphate batteries or super capacitors is beneficial for fast and large energy storage. With the stabilizing circuit coupled in parallel with the energy storage device 1, the battery protection device effectively maintains the voltage between the two terminals of the lithium iron phosphate batteries or the super capacitors at a relatively stable level and ensures the stability of the circuit. Moreover, the super capacity also fully exploits its advantages of fast-charging and fast-discharging.

The voltage detection and display device 2 has a voltage detection circuit and a display. The display has a press key used to switch on or off the display. Displaying of the voltage between the two terminals of the battery protection device is kept in an always-on status by controlling the press key, thereby it is more convenient to control the operation status of the battery protection device as well as the operation status of the battery.

The positive connecting terminal and the negative connecting terminal of the energy storage device 1 are coupled with conducting cables, respectively. Each conducting cable has a ring-shaped connector 5 at its free end. The battery protection device can be conveniently connected to or disconnected from the battery via the connectors 5. Moreover, the housing of the battery protection device is a case made of plastic material or aluminum alloy, which is easy to make at low cost. The exterior of the housing has a double-sided adhesive which enables easy attachment of the battery protection device to the battery. The adhesion provides firm attachment and safety.

The battery device has a battery with poles. The battery device also has the aforementioned battery protection device, which can be attached to the exterior of the battery via the double-sided adhesive. The connectors 5 at the free ends of the conducting cables of the positive connecting terminal and the negative connecting terminal are configured to encircle the poles to connect in parallel the battery protection device with the battery.

The battery device uses a battery protection device. When the vehicle starts, an instantaneous high current discharged by the battery can be reduced by the battery protection device coupled in parallel with the battery. Current shunting is conducted to reduce the damages to the battery caused by the instantaneous high current discharged by the battery, to protect the battery and extend the lifetime of the battery. After the vehicle has started, in case that the accelerator switches modes, the battery protection device helps the battery to stabilize the voltage and reduces the voltage fluctuation of the battery, and also indicates the operation status of the battery at any time in order to effectively control the discharging stability of the battery.

The aforementioned embodiments are merely preferred embodiments of the present invention and are not used as limitation to the present invention. Other variations and changes to the disclosed embodiments can be understood and implemented by those skilled in the art. Any variation, equivalent replacement or improvement within the spirit and principle of the present invention should fall within the protection scope the present invention.

What is claimed is:

1. A battery protection device, comprising:
    a shunt device (4) and
    a positive connecting terminal and a negative connecting terminal coupled to a battery for a vehicle;
    wherein said shunt device (4) comprises:
        an energy storage device (1) comprising a plurality of lithium iron phosphate batteries, and
        a stabilizing circuit (3) for stabilizing a voltage of the energy storage device (1),
        the energy storage device (1) being coupled in parallel with the stabilizing circuit (3), the positive connecting terminal being coupled to a positive terminal of the energy storage device (1) and the negative connecting terminal being coupled to a negative terminal of the energy storage device (1);
    wherein a number of the plurality of lithium iron phosphate batteries is 3 to 12;
    and wherein the battery protection device is configured to shunt a current flowing through the battery when the vehicle starts.

2. The battery protection device according to claim 1, wherein a capacity of the plurality of lithium iron phosphate batteries is 0.5 Ah to 10 Ah.

3. The battery protection device according to claim 1, wherein the positive connecting terminal and the negative connecting terminal are coupled to conductive cables, respectively, and the conductive cables have ring-shaped connectors (5) at their free ends.

4. The battery protection device according to claim 1, wherein the battery protection device further comprises a housing for receiving the shunt device, and wherein the housing has double-sided adhesive at its exterior.

5. The battery protection device according to claim 4, wherein the housing is made of plastic material or aluminum alloy.

6. A battery device comprising the battery protection device and the battery for the vehicle according to claim 1, the battery having poles, the battery protection device being attachable to an exterior of the battery via a double-sided adhesive, and connectors (5) at free ends of conducting cables coupled to the positive connecting terminal and negative connecting terminal are configured to encircle the poles to couple the battery protection device in parallel with the battery.

7. The battery device according to claim 6, wherein a capacity of the plurality of lithium iron phosphate batteries is 0.5 Ah to 10 Ah.

8. The battery device according to claim 6, wherein the conductive cables have ring-shaped connectors (5) at their free ends.

9. The battery device according to claim 6, wherein the battery protection device further comprises a housing for receiving the shunt device, and wherein the housing has the double-sided adhesive at its exterior.

10. The battery device according to claim 9, wherein the housing is made of plastic material or aluminum alloy.

11. The battery protection device according to claim 1, wherein the shunt device further comprises:
    a voltage detection and display device (2) for feeding back in real time a terminal voltage of the energy storage device (1), and
    wherein the voltage detection and display device (2) is coupled in parallel with the energy storage device (1).

12. The battery protection device according to claim 11, wherein the voltage detection and display device (2) comprises a voltage detection circuit and a display, the display having a press key for switching on or off the display.

13. The battery device according to claim 6, wherein the shunt device further comprises:
    a voltage detection and display device (2) for feeding back in real time a terminal voltage of the energy storage device (1), and
    wherein the voltage detection and display device (2) is coupled in parallel with the energy storage device (1).

14. The battery device according to claim 13, wherein the voltage detection and display device (2) comprises a voltage detection circuit and a display, the display having a press key for switching on or off the display.

* * * * *